United States Patent
Takamatsu et al.

(10) Patent No.: US 7,478,791 B2
(45) Date of Patent: Jan. 20, 2009

(54) FLEXIBLE MOLD COMPRISING CURED POLYMERIZABLE RESIN COMPOSITION

(75) Inventors: Yorinobu Takamatsu, Sagamihara (JP); Akira Yoda, Machida (JP)

(73) Assignee: 3M Innovative Properties Company, St. Paul, MN (US)

( * ) Notice: Subject to any disclaimer, the term of this patent is extended or adjusted under 35 U.S.C. 154(b) by 341 days.

(21) Appl. No.: 11/107,554

(22) Filed: Apr. 15, 2005

(65) Prior Publication Data

US 2006/0231728 A1 Oct. 19, 2006

(51) Int. Cl.
*B28B 7/34* (2006.01)

(52) U.S. Cl. .................. 249/134; 264/337; 264/338

(58) Field of Classification Search .......... 249/134; 264/337, 338; 525/452; 428/423.1
See application file for complete search history.

(56) References Cited

U.S. PATENT DOCUMENTS

| | | | |
|---|---|---|---|
| 4,929,403 A * | 5/1990 | Audsley | 264/446 |
| 5,763,503 A * | 6/1998 | Cowperthwaite et al. | 522/44 |
| 5,814,267 A * | 9/1998 | Sakai et al. | 264/496 |
| 6,247,986 B1 | 6/2001 | Chiu et al. | |
| 6,306,948 B1 | 10/2001 | Yokoyama et al. | |
| 6,352,763 B1 | 3/2002 | Dillon et al. | |
| 6,449,413 B1 * | 9/2002 | Duecker | 385/115 |
| 6,537,645 B1 | 3/2003 | Yokoyama et al. | |
| 6,761,607 B2 | 7/2004 | Kikuchi et al. | |
| 6,821,178 B2 | 11/2004 | Sugimoto et al. | |
| 6,843,952 B1 | 1/2005 | Yokoyama | |
| 6,878,333 B1 * | 4/2005 | Yokoyma et al. | 264/494 |
| 2006/0131784 A1 * | 6/2006 | Sugimoto | 264/293 |

FOREIGN PATENT DOCUMENTS

| | | |
|---|---|---|
| EP | 1 014 113 | 6/2000 |
| FR | 2 713 977 | 6/1995 |
| JP | 8-273537 | 10/1996 |
| JP | 8-273538 | 10/1996 |
| WO | WO 99/60446 | 11/1999 |
| WO | WO 03/032353 | 4/2003 |
| WO | WO 03/032354 | 4/2003 |
| WO | WO 2004/007166 | 1/2004 |
| WO | WO 2004/010452 | 1/2004 |
| WO | WO 2004/043664 | 5/2004 |
| WO | WO 2004/062870 | 7/2004 |
| WO | WO 2004/064104 | 7/2004 |
| WO | WO 2005/013308 | 2/2005 |
| WO | WO 2005/019934 | 3/2005 |
| WO | WO 2005/021260 | 3/2005 |

OTHER PUBLICATIONS

Search Report, Aug. 25, 2006.
"A Method for Estimating Both the Solubility Parameters and Molar Volumes of Liquids"; R. Fedros, Polymer Engineering and Science, Feb. 1974, vol. 14, No. 2.
Pending U.S. Appl. No. 11/030,261, filed Jan. 6, 2005.
Pending PCT Application No. US04/32801 filed Oct. 6, 2004.
Pending PCT Application No. US04/33170 filed Oct. 8, 2004.
Pending PCT Application No. US04/43471 filed Dec. 22, 2004.
Pending JP Application No. 2004-108999 filed Apr. 1, 2004.

* cited by examiner

*Primary Examiner*—Yogendra Gupta
*Assistant Examiner*—Maria Veronica D Ewald
(74) *Attorney, Agent, or Firm*—Carolyn A. Fischer (57) ABSTRACT

The present invention relates to methods of making a flexible mold from a polymerizable resin composition, the flexible mold, the polymerizable resin composition, as well as methods of using the flexible mold.

15 Claims, 4 Drawing Sheets

FLEXIBLE MOLD COMPRISING CURED POLYMERIZABLE RESIN COMPOSITION

BACKGROUND

Advancements in display technology, including the development of plasma display panels (PDPs) and plasma addressed liquid crystal (PALC) displays, have led to an interest in forming electrically-insulating barrier ribs on glass substrates. The barrier ribs separate cells in which an inert gas can be excited by an electric field applied between opposing electrodes. The gas discharge emits ultraviolet (UV) radiation within the cell. In the case of PDPs, the interior of the cell is coated with a phosphor that gives off red, green, or blue visible light when excited by UV radiation. The size of the cells determines the size of the picture elements (pixels) in the display. PDPs and PALC displays can be used, for example, as the displays for high definition televisions (HDTV) or other digital electronic display devices.

One way barrier ribs can be formed on glass substrates is by direct molding. This has involved laminating a mold onto a substrate with a glass- or ceramic-forming composition disposed therebetween. The glass or ceramic-forming composition is then solidified and the mold is removed. Finally, the barrier ribs are fused or sintered by firing at a temperature of about 550° C. to about 1600° C. The glass- or ceramic-forming composition has micrometer-sized particles of glass frit dispersed in an organic binder. The use of an organic binder allows barrier ribs to be solidified in a green state so that firing fuses the glass particles in position on the substrate.

The mold for producing the barrier ribs may be a flexible mold. The flexible mold may comprise a support and a shape-imparting layer comprising the reaction product of at least one urethane acrylate oligomer and at least one (meth)acryl monomer as described PCT Publication No. WO2005/021260. The flexible mold may be produced from a transfer mold having substantially the same microstructured pattern as the eventual barrier ribs.

Although various transfer molds and flexible molds suitable for use in the molding of barrier ribs have been described, industry would find advantage in new methods and molds.

SUMMARY OF THE INVENTION

Presently described are certain polymerizable resin compositions suitable for use as the shape-imparting layer of a flexible mold. In preferred embodiments, the resin compositions impart improved properties. For example, in some embodiments the transfer mold can be reused due to a low degree of swelling of the transfer mold. This low degree of swelling is attributed to the composition of the polymerizable resin provided in the recesses of the transfer mold.

In one embodiment, the invention relates to a method of making a flexible mold. The method comprises providing a polymeric transfer mold having a microstructured surface substantially the same as the eventual barrier ribs; providing a polymerizable resin composition in at least the recesses of the microstructured surface of the polymeric transfer mold; stacking a support comprising a flexible polymeric film onto the polymeric transfer mold; curing the polymerizable composition; and removing the cured polymerizable resin composition together with the support from the polymeric transfer mold, thereby forming a flexible mold comprising a support and shape-imparting layer having an inverse pattern of the eventual barrier ribs; wherein the polymeric transfer mold is reused (e.g. at least 5-10 times). In other words two or more flexible molds by repeating the method using the same transfer mold. The microstructured surface of the polymeric transfer mold may comprise a cured silicone rubber. The polymerizable composition comprises the reaction product of at least one ethylenically unsaturated oligomer and at least one ethylenically unsaturated monomer.

In other embodiments, flexible molds are described wherein the shape-imparting layer of the flexible mold comprises the reaction product of certain polymerizable composition comprising at least one urethane (meth)acrylate oligomer and at least one (meth)acryl monomer. The polymerizable compositions can be prepared into a flexible mold using the method just described. The shape-imparting layer is preferably provided on a polymeric film support.

In one embodiment, the polymerizable composition comprises at 20 wt-% of at least one (meth)acryl monomer having a molecular weight (Mw) of at least 300 g/mole. In other embodiments, the polymerizable composition comprises at least one (meth)acryl monomer having a molecular weight of at least 350 g/mole or at least 400 g/mole. The (meth)acryl monomer typically has a molecular weight (Mw) of less than 800 g/mole.

In others embodiments, the polymerizable composition has certain criteria relating to the solubility parameter of the (meth)acryl monomer and/or the molecular weight of the urethane (meth)acrylate oligomer. In one aspect, a urethane (meth)acrylate oligomer having a molecular weight (Mw) ranging from 1000 g/mole to 3500 g/mole in combined with at least one (meth)acryl monomer having a solubility parameter of at least 19 $[MJ/m^3]^{1/2}$. In another embodiment, the polymerizable composition comprises at least 60 wt-% urethane (meth)acrylate oligomer having a molecular weight (Mw) ranging from 4500 g/mole to 50,000 g/mole and greater than 25 wt-% of a (meth)acryl monomer having a solubility parameter of at least 20 $[MJ/m^3]^{1/2}$. In yet other embodiments, the polymerizable composition comprises at least one (meth)acryl monomer having a solubility parameter of at least 21 $[MJ/m^3]^{1/2}$.

For embodiments wherein the polymerizable composition is photocured, the polymerizable composition comprises one or more photoinitiators such as 2-hydroxy-2-methyl-1-phenylpropane-1-one; 1-[4-(2-hydroxyethoxy)-phenyl]-2-hydroxy-2-methyl-1-propane-1-one; 2,2-dimethoxy-1,2-diphenylethane-1-one; 2-methyl-1-[4-(methylthio)phenyl]-2-morpholino-1-propanone, and mixtures thereof.

In another embodiment, a method of producing a fine structure (e.g. barrier ribs for a plasma display panel) is described. The method comprises providing any of the flexible molds described herein; providing a curable (e.g. rib precursor) material between a substrate and the shape-imparting layer of the mold; curing the material forming a fine structure integrally bonded with the substrate; and releasing the fine structure from the mold.

DETAILED DESCRIPTION OF THE PREFERRED EMBODIMENTS

The present invention relates to methods of making a flexible mold from a polymerizable resin composition, the flexible mold, the polymerizable resin composition, as well as methods of using the flexible mold. Hereinafter, the embodiments of the invention will be explained with reference to a flexible mold suitable for making microstructures such as barrier ribs. The polymerizable resin and flexible mold can be utilized with other (e.g. microstructured) devices and articles such as for example, electrophoresis plates with capillary channels and lighting applications. The polymerizable resin may be suitable for forming other microstructured articles such as brightness enhancing films. In particular, devices and articles that can utilize molded microstructures can be formed using the methods described herein. While the present invention is not so limited, an appreciation of various aspects of the invention will be gained through a discussion of methods, apparatus and articles for the manufacture of barrier ribs for PDPs.

The recitation of numerical ranges by endpoints includes all numbers subsumed within the range (e.g. the range 1 to 10 includes 1, 1.5, 3.33, and 10).

Unless otherwise indicated, all numbers expressing quantities of ingredients, measurements of properties, and so like as used in the specification and claims are to be understood to be modified in all instances by the term "about."

("Meth)acryl" refers to functional groups including acrylates, methacrylates, acrylamide, and methacrylamide.

"(Meth)acrylate" refers to both acrylate and methacrylate compounds.

Figure 1:
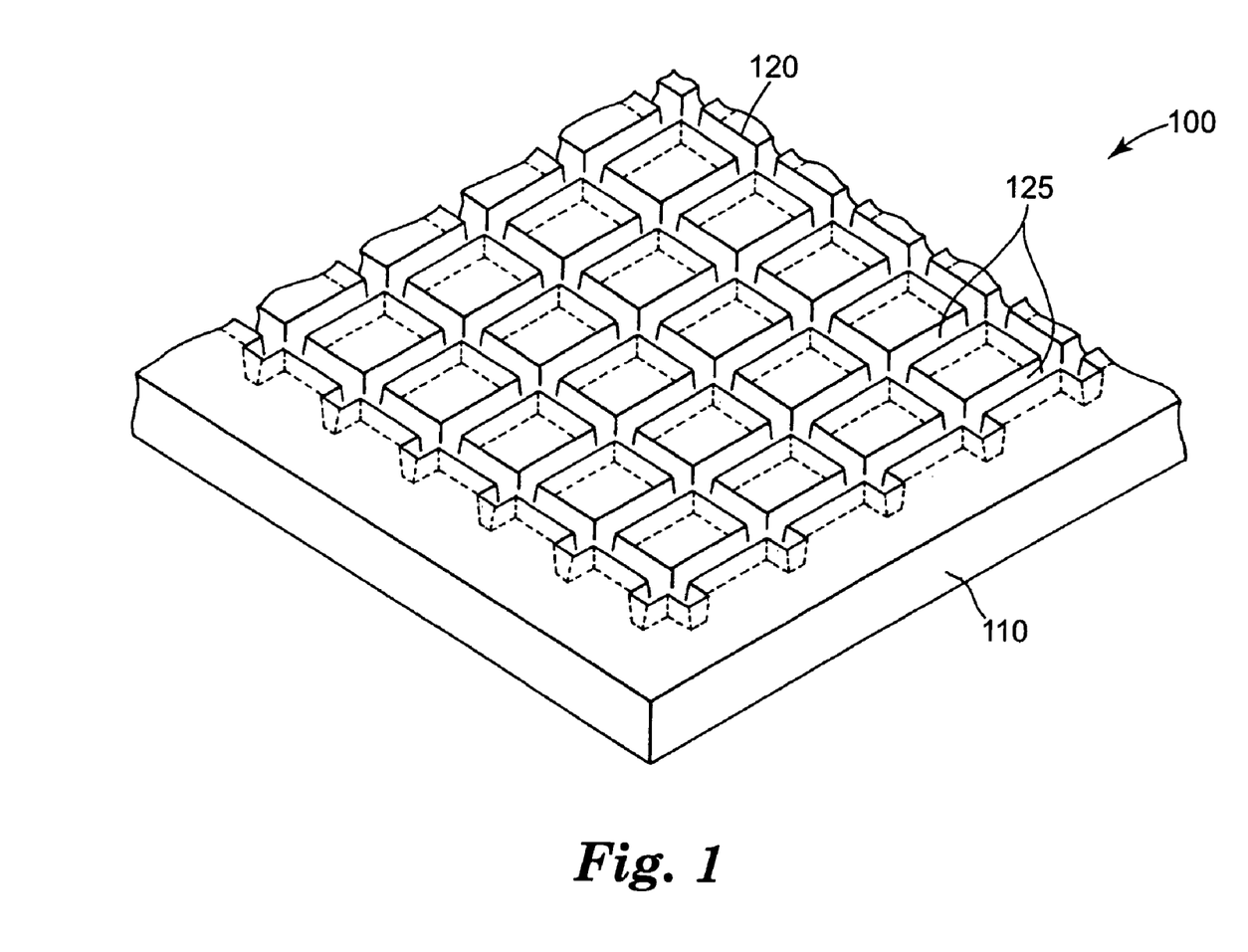
FIG. 1 is a perspective view of an illustrative flexible mold suitable for making barrier ribs.

FIG. 1 is a partial perspective view showing an illustrative flexible mold 100. The flexible mold 100 generally has a two-layered structure having a planar support layer 110 and a microstructured surface, referred to herein as a shape-imparting layer 120 provided on the support. The flexible mold 100 of FIG. 1 is suitable for producing a grid-like rib pattern of barrier ribs on a (e.g. electrode patterned) back panel of a plasma display panel. Another common barrier ribs pattern (not shown) comprises plurality of (non-intersecting) ribs arranged in parallel with each other.

The depth, pitch and width of the microstructures of the shape-imparting layer can vary depending on the desired finished article. The depth of the microstructured (e.g. groove) pattern 125 (corresponding to the barrier rib height) is generally at least 100 µm and typically at least 150 µm. Further, the depth is typically no greater than 500 µm and typically less than 300 µm. The pitch of the microstructured (e.g. groove) pattern may be different in the longitudinal direction in comparison to the transverse direction. The pitch is generally at least 100 µm and typically at least 200 µm. The pitch is typically no greater than 600 µm and preferably less than 400 µm. The width of the microstructured (e.g. groove) pattern 4 may be different between the upper surface and the lower surface, particularly when the barrier ribs thus formed are tapered. The width is generally at least 10 µm, and typically at least 50 µm. Further, the width is typically no greater than 100 µm and typically less than 80 µm.

The thickness of a representative shape-imparting layer is at least 5 µm, typically at least 10 µm, and more typically at least 50 µm. Further, the thickness of the shape-imparting layer is no greater than 1,000 µm, typically less than 800 µm and more typically less than 700 µm. When the thickness of the shape-imparting layer is below 5 µm, the desired rib height typically cannot be obtained. When the thickness of the shape-imparting layer is greater than 1,000 µm, warp and reduction of dimensional accuracy of the mold can result due to excessive shrinkage.

Figure 2:
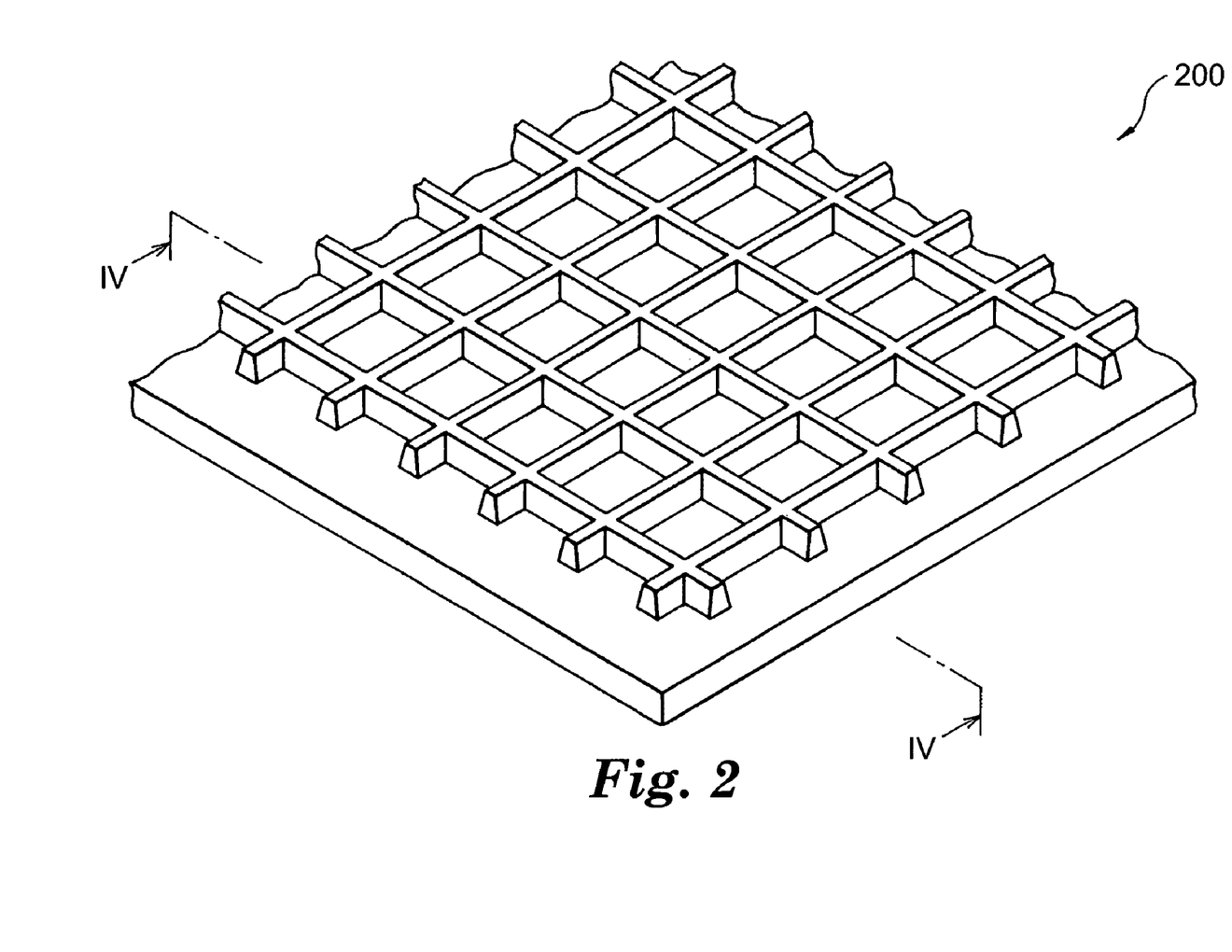
FIG. 2 is a perspective view of an illustrative transfer mold suitable for making the flexible mold of FIG. 1
Figure 3A:
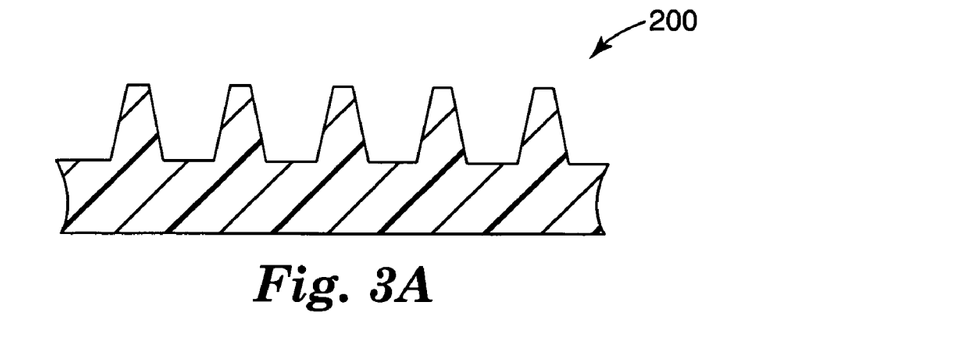
FIG. 3A-3C is a sectional view, in sequence, showing an illustrative method of making a flexible mold from a transfer mold.
Figure 3B:
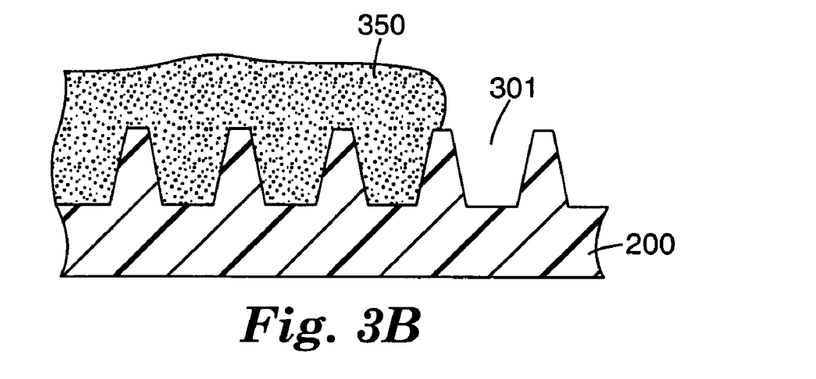
Figure 3C:
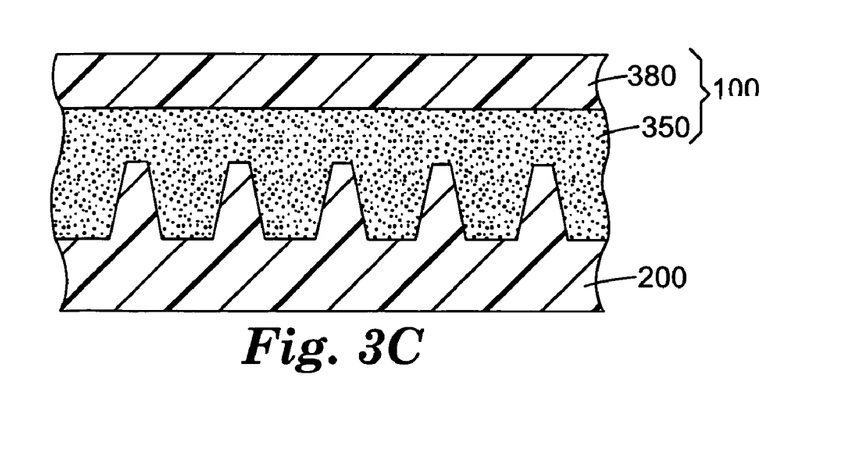

The flexible mold is typically prepared from a transfer mold, having a corresponding inverse microstructured surface pattern as the flexible mold. For example, a perspective view of an illustrative transfer mold 200 suitable for making the flexible mold of FIG. 1 is depicted in FIG. 2. A sectional view of transfer mold 200 of FIG. 2 taken along line IV-IV is depicted in FIG. 3A.

In an embodied method of manufacture of the flexible mold (e.g. of FIG. 1) with a transfer mold (e.g. of FIG. 2), a polymerizable resin composition 350 is provided at least in the recesses of the microstructured surface of the polymeric transfer mold 200. This can be accomplished with known customary coating means such as a knife coater or a bar coater. A support 380 comprising a flexible polymeric film is stacked onto the polymerizable resin filled mold such that the resin contacts the support. While stacked in this manner, the polymerizable resin composition is cured. Photocuring is typically preferred. For this embodiment, it is preferred that the support as well as the polymerizable composition are sufficiently optically transparent such that rays of light irradiated for curing can pass through the support. Typically, the flexible mold has a haze (as measured according to the test method described in the examples) of less than 15%, typically less than 10% and more typically no greater than 5%. Once cured, the flexible mold 100, having support film 380 integrally bonded to the shape-imparting layer formed from the cured polymerizable resin, is separated from the transfer mold 200.

The photocurable polymerizable composition preferably comprises one or more photoinitiators at a concentrations ranging from 0.05 wt-% to 5 wt-% of the polymerizable resin composition. Suitable photoinitiators include for example, 2-hydroxy-2-methyl-1-phenylpropane-1-one; 1-[4-(2-hydroxyethoxy)-phenyl]-2-hydroxy-2-methyl-1-propane-1-one; 2,2-dimethoxy-1,2-diphenylethane-1-one; 2-methyl-1-[4-(methylthio)phenyl]-2-morpholino-1-propanone; and mixtures thereof.

Prior to use in the method, the transfer mold and support film are typically conditioned in a humidity and temperature controlled chamber (e.g. 22° C./55% relative humidity) to minimize any dimensional changes thereof. Such conditioning is further described in WO 2004/010452; WO 2004/043664 and JP Application No. 2004-108999, filed Apr. 1, 2004; incorporated herein by reference. It is also desirable to maintain a constant humidity and temperature during the method of making the flexible mold from the transfer mold.

Although the support may optionally comprise the same material as the shape-imparting layer, for example by coating the polymerizable composition onto the transfer mold in an amount in excess of the amount needed to only fill the recesses, the support is typically a preformed polymeric film. The thickness of the polymeric support film is typically at least 0.025 millimeters, and more typically at least 0.075 millimeters. Further the thickness of the polymeric support film is generally less than 0.5 millimeters and typically less than 0.175 millimeters. The tensile strength of the polymeric support film is generally at least about 5 kg/mm$^2$ and typically at least about 10 kg/mm$^2$. The polymeric support film typically has a glass transition temperature (Tg) of about 60° C. to about 200° C. Various materials can be used for the support of the flexible mold including cellulose acetate butyrate, cellulose acetate propionate, polyether sulfone, polymethyl methacrylate, polyurethane, polyester, and polyvinyl chloride. The surface of the support may be treated to promote adhesion to the polymerizable resin composition. Examples of suitable polyethylene terephthalate based materials include photograde polyethylene terephthalate and polyethylene terephthalate (PET) having a surface that is formed according to the method described in U.S. Pat. No. 4,340,276; incorporated herein by reference.

The transfer mold 200 has a polymeric microstructured surface that is susceptible to damage by exposure to the polymerizable resin employed while making the flexible mold therefrom. The transfer mold may comprise a cured polymeric material, such as a cured silicone rubber, as described for example in U.S. application Ser. No. 11/030,261 filed Jan. 6, 2005, incorporated herein by reference. One suitable cured silicon rubber comprises the reaction product of polyalkylsiloxane, polyalkoxysiloxane, and silica (commercially available from GE Toshiba Silicone Co., Ltd under the trade designation "TSE3502") and 0.5 parts by weight dialkyl tin catalyst (also commercially available from GE Toshiba Silicone Co., Ltd under the trade designation "CE62").

The Applicant has found that the transfer mold can be reused (e.g. in the method just described). The Applicants has also found that the number of times (i.e. cycles) the transfer mold can be reused relates to the polymerizable resin composition employed in the method for making the shape-imparting layer of the flexible mold.

By proper selection of the polymerizable resin composition as described herein, the polymeric transfer mold can be reused at least 5 times (e.g. at least 10 times). In preferred embodiments the polymeric transfer mold can be reused at least 20 times, at least 25 times, at least 30 times, at least 35 times, or at least 40 times or more. The transfer mold can be reused when the extent of swelling of the microstructured surface of the transfer mold is less than 10% and more typically less than 5%, as can be determined by visual inspection with a microscope (as described in further detail in the forthcoming examples).

The polymerizable composition generally comprises at least one ethylenically unsaturated oligomer and at least one ethylenically unsaturated diluent. The ethylenically unsaturated diluent is copolymerizable with the ethylenically unsaturated oligomer. The oligomer generally has a weight average molecular weight (Mw) as determined by Gel Permeation Chromatography (described in greater detail in the example) of at least 1,000 g/mole and typically less than 50,000 g/mole. The ethylenically unsaturated diluent generally has a Mw of less than 1,000 g/mole and more typically less than 800 g/mole.

The polymerizable composition is preferably radiation curable. "Radiation curable" refers to functionality directly or indirectly pendant from a monomer, oligomer, or polymer backbone (as the case may be) that react (e.g. crosslink) upon exposure to a suitable source of curing energy. Representative examples of radiation crosslinkable groups include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are preferred. Of these, (meth)acryl moieties are preferred with (meth)acrylate functionality being more preferred. Typically at least one of the ingredients of the polymerizable composition, and most typically the oligomer, comprises at least two (meth)acryl groups.

Various known oligomers having (meth)acryl functional groups can be employed. Suitable radiation curable oligomers include (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated polyethers (i.e., polyether (meth)acrylates) and (meth)acrylated polyolefins.

In preferred embodiments, the polymerizable composition comprises at least one urethane (meth)acrylate oligomer and at least one (meth)acryl monomer. (Meth)acrylated aliphatic urethanes are di(meth)acrylate esters of hydroxy terminated NCO extended aliphatic polyesters or aliphatic polyethers. The urethane (meth)acrylate oligomer(s) and (meth)acryl monomer(s) preferably have a glass transition temperature (Tg) of about −80° C. to about 60° C., respectively, meaning that the homopolymers thereof have such glass transition temperatures.

The (e.g. urethane (meth)acrylate) oligomer(s) are generally combined with the (meth)acryl monomers in amounts of 5 wt-% to 90 wt-% of the total polymerizable composition. Typically, the amount of oligomer is at least 20 wt-%, more typically at least 30 wt-%, and more typically at least 40 wt-%. In at least some embodiments, the amount of oligomer is at least 50 wt-%, 60 wt-%, 70 wt-%, or 80 wt-%. In order that the polymerizable composition can fill the recesses of the transfer mold without entrapment of air, the viscosity (as determined by the test method described in the examples) of the polymerizable composition is typically less than 50,000 cps, preferably less than 35,000 cps and more preferably less than 25,000 cps. The Brookfield viscosity is at least 10 cps, typically at least 50 cps, more typically at least 100 cps, even more typically at least 500 cps, and in at least some preferred embodiments at least 1000 cps.

Various urethane (meth)acrylate oligomers are known. Examples of commercially available (meth)acrylated urethanes include those commercially available from Henkel Corp., Hoboken, N.J. under the trade designation "Photomer"; commercially available from UCB Radcure Inc., Smyrna, Ga. under the trade designation "Ebecryl" series 230, 244, 264, 265, 270, 1290, 2001, 4830, 4833, 4835, 4842, 4866, 4883, 8301, 8402, 8800, 8803, 8804, 8807. Urethane (meth)acrylate oligomers are also commercially available from Nippon Kayaku Co., Ltd under the trade designation "UX-8101"; from Shin-nakamura Chemical Industry under the trade designation "UA-1083F"; from Nihongosei Chemical Industry under the trade designation "UV3000B"; and from Shin-nakamura Chemical Industry under the trade designation "UA-512T".

Various (meth)acryl monomers are known including for example aromatic (meth)acrylates including phenoxyethylacrylate, phenoxyethyl polyethylene glycol acrylate, nonylphenoxy polyethylene glycol, 3-hydroxyl-3-phenoxypropyl acrylate and (meth)acrylates of ethylene oxide modified bisphenol; hydroxyalkyl (meth)acrylates such as 4-hydroxybutylacrylate; alkylene glycol (meth)acrylates and alkoxy alkylene glycol (meth)acrylates such as methoxy polyethylene glycol monoacrylate and polypropylene glycol diacrylate; polycaprolactone (meth)acrylates; alkyl carbitol (meth)acrylates such as ethylcarbitol acrylate and 2-ethylhexylcarbitol acrylate; as well as various multifunctional (meth)acryl monomers including 2-butyl-2-ethyl-1,3-propanediol diacrylate and trimethylolpropane tri(meth)acrylate.

Preferably, the Mw of the (e.g. urethane (meth)acrylate) oligomer is less than 40,000 g/mole. In some embodiments, the Mw of the (e.g. urethane (meth)acrylate) oligomer is less than 30,000 g/mole. In other embodiments, the Mw of the (e.g. urethane (meth)acrylate) oligomer is less than 20,000 g/mole. In some embodiments, the urethane (meth)acrylate oligomer has a Mw ranging from 1000 g/mole to 3500 g/mole. In other embodiments, the urethane (meth)acrylate oligomer has a Mw ranging of at least 4500 g/mol or at least 6,000 g/mole.

In one embodiment, the Applicant has found that the reuse of the mold can be increased by use of at least 20 wt-% of (meth)acryl monomer having a molecular weight (Mw) of at least 300 g/mole. In another embodiment, the molecular weight of the (meth)acryl monomer is at least 350 g/mole or at least 400 g/mole. The (meth)acrylate monomer(s) having a molecular weight (Mw) of at least 300 g/mole typically comprise at least 25 wt-%, and more typically at least 30 wt-% of the total amount of the monomeric portion of the polymerizable composition. In at least some embodiments, the (meth) acryl monomer(s) having a molecular weight (Mw) of at least 300 g/mole are combined with a urethane (meth)acrylate oligomer having a molecular weight (Mw) of at least 6,000 g/mole.

In another embodiment, at least one urethane (meth)acrylate oligomer is combined with one or more (meth)acrylate monomers having certain solubility parameters. The solubility parameter of various monomers, δ(delta), can conveniently be calculated using the expression:

$$\delta = (\Delta Ev/V)^{1/2},$$

where $\Delta Ev$ is the energy of vaporization at a given temperature and V is the corresponding molar volume. According to Fedors' method, the SP can be calculated with the chemical structure (R. F. Fedors, *Polym. Eng. Sci.*, 14(2), p. 147, 1974, Polymer Handbook $4^{th}$ Edition "Solubility Parameter Values" edited by J. Brandrup, E. H. Immergut and E. A. Grulke).

Accordingly, the solubility parameter of various monomeric diluents can be calculated. Various illustrative (meth) acrylate monomers, the molecular weight (Mw) thereof, as well as the solubility parameter thereof are reported in the examples. Various combinations of such monomers can be employed as would be apparent by one of ordinary skill in the art.

When the solubility parameter is less 19.0 $[MJ/m^3]^{1/2}$, the (meth)acrylate monomer can swell the (e.g. silicone rubber based) transfer mold. This is particularly apparent when the polymerizable composition comprises (meth)acryl monomers having a molecular weight (Mw) of less than 300 g/mole. However, when the (meth)acryl monomer has a solubility parameter of greater than 30.0 $[MJ/m^3]^{1/2}$ the (meth) acryl monomer generally has poor solubility with the (e.g. urethane (meth)acrylate) oligomer. In some embodiments, the monomeric diluent comprises or consists of (meth)acryl monomer having a solubility parameter of at least 20 $[MJ/m^3]^{1/2}$ or at least 21 $[MJ/m^3]^{1/2}$.

One combination comprises at least one the urethane (meth)acrylate oligomer having Mw ranging from 1000 g/mole to 3500 g/mole wherein the monomeric diluent comprises at least one (meth)acryl monomer having a solubility parameter of at least 19 $[MJ/m^3]^{1/2}$. Another combination comprises at least 60 wt-% of at least one urethane (meth) acrylate oligomer having a molecular weight (Mw) ranging from 4500 g/mole to 50,000 g/mole and greater than 25 wt-% of a (meth)acryl monomer having a solubility parameter of at least 20 $[MJ/m^3]^{1/2}$.

The cured polymerizable resin preferably has a glass transition temperature, Tg, as measured according to the test method set forth in the examples of at least −70° C., and preferably at least −60° C. The Tg of the cured resin is preferably less than 50° C., and more preferably less than 40° C. In at least some preferred embodiments, the Tg of the cured resin is less than 30° C., less than 20° C., or less than 10° C. The elastic modulus (E') at room temperature (i.e. 22° C.) may range from 1 to 600 MPa (MPa=$10^6$Pa). In at least some preferred embodiments, E' is less than 200 MPa.

Figure 4A:
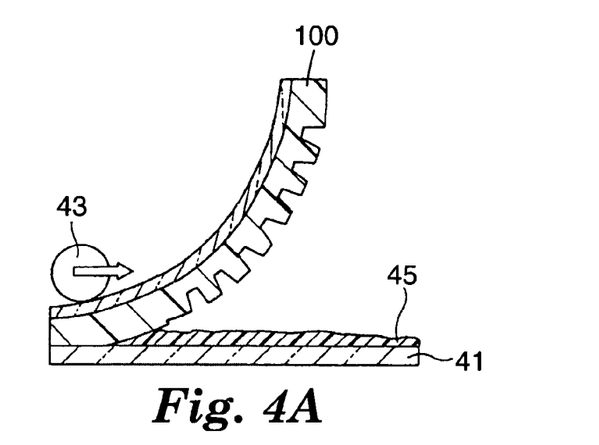
FIG. 4A-4C is a section view, in sequence of an illustrative method of making a fine structure (e.g. barrier ribs) by use of a flexible mold.
Figure 4B:
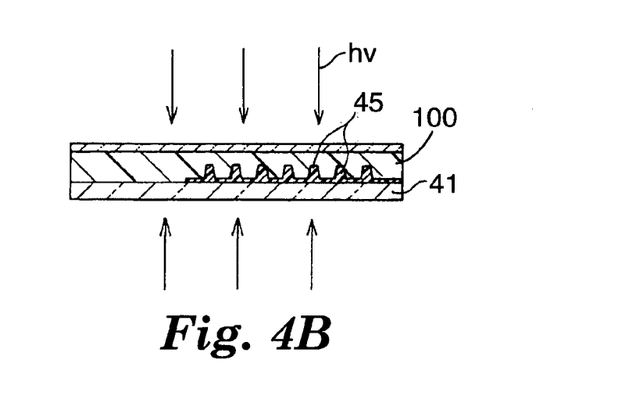
Figure 4C:
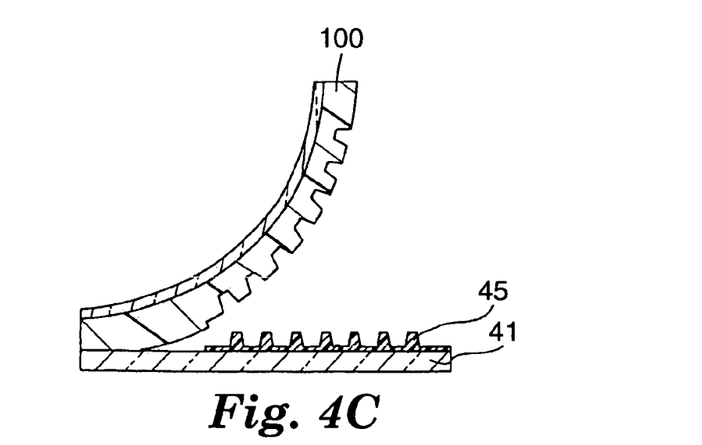

The flexible mold described herein can be used in various known methods as described in the art. The flexible mold 100, can be used to produce barrier ribs on a substrate for a plasma display panel. Prior to use, the flexible mold may be preconditioned in the same manner as preconditioning the support prior to making the flexible mold as previously described. With reference to FIG. 4A, a flat transparent (e.g. glass) substrate 41, having a striped electrode pattern is provided. The flexible mold 100 of the invention is positioned for example by use of a sensor such as a CCD charge coupled device camera, such that the barrier pattern of the mold is aligned with the patterned substrate. A barrier rib precursor 45 such as a curable ceramic paste can be provided between the substrate and the shape-imparting layer of the flexible mold in a variety of ways. The curable material can be placed directly in the pattern of the mold followed by placing the mold and material on the substrate, the material can be placed on the substrate followed by pressing the mold against the material on the substrate, or the material can be introduced into a gap between the mold and the substrate as the mold and substrate are brought together by mechanical or other means. As depicted in FIG. 4A, a (e.g. rubber) roller 43 may be employed to engage the flexible mold 100 with the barrier rib precursor. The rib precursor 45 spreads between the glass substrate 41 and the shape-imparting surface of the mold 100 filling the groove portions of the mold. In other words, the rib precursor 45 sequentially replaces air of the groove portions. Subsequently, the rib precursor is cured. The rib precursor is preferably cured by radiation exposure to (e.g. UV) light rays through the transparent substrate 41 and/or through the mold 100 as depicted on FIG. 4B. Finally, as shown in FIG. 4C, the flexible mold 100 is removed while the resulting ribs 48 remain bonded to the substrate 41.

An example of a suitable rib precursor composition comprises a glass- or ceramic-forming component that provides a rib shape such as a mixture of aluminum oxide and lead glass or phosphate glass, a binder component, and a curing agent such as a polymerization initiator. Other preferred rib compositions are described in concurrently filed patent application Ser. No. 11/107,608. The rib precursor preferably has a viscosity of less than 20,000 cps and more preferably less than 5,000 cps to uniformly fill all the groove portions without entrapping air.

Various other aspects that may be utilized in the invention described herein are known in the art including, but not limited to each of the following patents that are incorporated herein by reference: U.S. Pat. No. 6,247,986; U.S. Pat. No. 6,537,645; U.S. Pat. No. 6,352,763; U.S. Pat. No. 6,843,952, U.S. Pat. No. 6,306,948; WO 99/60446; WO 2004/062870; WO 2004/007166; WO 03/032354; WO 03/032353; WO 2004/010452; WO 2004/064104; U.S. Pat. No. 6,761,607; U.S. Pat. No. 6,821,178; WO 2004/043664; WO 2004/062870; PCT Application No. US04/33170, filed Oct. 8, 2004; PCT Application No. US04/26701, filed Aug. 17, 2004; PCT Application No. US04/26845, filed Aug. 18, 2004; PCT Application No. US04/23472 filed Jul. 21, 2004; PCT Application No. US04/32801 filed Oct. 6, 2004; and PCT Application No. US04/43471 filed Dec. 22, 2004.

The invention is further illustrated by the following non-limiting examples.

EXAMPLES

The ingredients employed in the examples are described in Table 1 as follows:

TABLE 1

| Chemical Name | Vendor Name | Trade Designation/ Abbreviation | Function |
|---|---|---|---|
| Polyalkysiloxane/ Tetraethoxysilane solution in acetone/isopropylalcohol/ tolune/n-butanol | GE Toshiba Silicone Co., Ltd | ME121 | Primer for SS plate |
| Polyalkysiloxane/ Polyalkoxysiloxane/Silica | GE Toshiba Silicone Co., Ltd | TSE3502 | Silicone resin to form silicone transfer mold |
| Dialkyl tin compound in aqueous dispersion | GE Toshiba Silicone Co., Ltd | CE62 | Catalyst for Silicone Resin |
| Aliphatic urethane diacrylate | Daicel-UCB Co., Ltd | EB 270 | Oligomer |
| Aliphatic urethane diacrylate | Daicel-UCB Co., Ltd | EB 230 | Oligomer |
| Aliphatic urethane diacrylate | Daicel-UCB Co., Ltd | EB 8402 | Oligomer |
| Aliphatic urethane diacrylate | Nihongosei Chemical Industry | UV3000B | Oligomer |
| Acrylated urethane oligomer | Nippon Kayaku Co., Ltd | UX-8101 | Oligomer |
| Acrylated urethane oligomer | Shin-nakamura Chemical Industry | UA-1083F | Oligomer |
| Phenoxyethylacrylate | Osaka Organic Chemical Industry, Ltd. | POA | Diluent |
| 4-hydroxybutylacrylate | Osaka Organic Chemical Industry, Ltd. | 4-HBA | Diluent |
| ethylcarbitol acrylate | Osaka Organic Chemical Industry, Ltd. | V#190 | Diluent |
| methoxy polyethyleneglycol (n = 9) monoacrylate | Shin-nakamura Chemical Industry | AM-90G | Diluent |
| polytetramethyleneglycol (n = 9) diacrylate | Shin-nakamura Chemical Industry | A-PTMG-65 | Diluent |
| polyproplyeneglycol (n = 12) diacrylate | Shin-nakamura Chemical Industry | APG-700 | Diluent |
| polycaprolactone modified (n = 1) monoacrylate | Diacel Chemical Industry | FA1DDM | Diluent |
| polycaprolactone modified (n = 2) monoacrylate | Diacel Chemical Industry | FA2D | Diluent |
| phenoxyethyl polyethyleneglycol (n = 2) acrylate | Kyoeisya Chemical Co., Ltd | P2H-A | Diluent |
| 2-butyl-2-ethyl-1,3-propanediol diacrylate | Kyoeisya Chemical Co., Ltd | BEPGA | Diluent |
| diacrylate of ethylene oxide (m + n = 4) modified bisphenol | Nippon Kayaku Co., Ltd. | R-551 | Diluent |
| trimethylolpropane triacrylate | Nippon Kayaku Co., Ltd. | TMPTA | Diluent |
| diacrylate of neopentylglycol hydroxypivalate ester | Nippon Kayaku Co., Ltd. | MANDA | Diluent |
| 2-hydroxy-3-phenoxypropyl acrylate | Toagosei Co., Ltd | M-5700 | Diluent |
| 2-ethylhexycarbitol acylate | Toagosei Co., Ltd. | M-120 | Diluent |
| nonylphenoxyethyl polyethyleneglycol acrylate (n = 2.5) | Toagosei Co., Ltd. | M-117 | Diluent |
| diacrylate of caprolactone modified neopentylglycol hydroxypivalate ester | Nippon Kayaku Co., Ltd. | HX-220 | Diluent |
| 2-hydroxy-2-methyl-1-phenylpropane-1-one | CIBA-GEIGY | Darocur 1173 | Photo-initiator |
| 1-[4-(2-hydroxyethoxy)-phenyl]-2-hydroxy-2-methyl-1-propane-1-one | CIBA-GEIGY | Irganox 2959 | Photo-initiator |
| 2,2-dimethoxy-1,2-diphenylethane-1-one | CIBA-GEIGY | Irganox 651 | Photo-initiator |
| 2-methyl-1-[4-(methylthio)phenyl]-2-morpholino-1-propanone | CIBA-GEIGY | Irganox 907 | Photo-initiator |

Preparation of Transfer Mold

A 200 mm×200 mm×1 mm stainless steel (SUS) plate was prepared to use as substrate for silicone resin mold. The SUS plate was primed (coated ME121 manufactured by GE Toshiba Silicone Co., LTD and dried in an oven at 150° C. for 1 hour) in order to strengthen the adhesion to the silicone mold. A 2-part room temperature curable silicone resin manufactured by GE Toshiba Silicone Co., LTD (mixture of 100 parts by weight of TSE3502 and 0.5 parts by weight of the catalyst, CE62) was coated on the primed surface of SUS plate with the thickness of 300 micron, and cured at room temperature for 7 days. A (non-microstructured) smooth-surfaced transfer mold was obtained.

Preparation of the Polymerizable Resin Compositions

Each of the polymerizable compositions set forth in the examples were prepared by combining the kinds and amounts of oligomer and monomer(s) set forth in Table 2 and mixing the ingredients at ambient temperature.

Reuseability of Transfer Mold

A UV curable resin composition was coated onto the smooth-surfaced transfer mold at a thickness of 300 micron and was laminated to 188 micron PET film, commercially available from Dupont Teijin Films, under the trade designation "Teijin Tetoron Film". From the side of PET film, the UV curable resin was irradiated with 1,000 mj/cm$^2$ of UV by used of a fluorescent lamp (manufactured by Mitsubishi Electric Osram LTD) having a peak wavelength at 352 nm. The flexible mold comprising a shape-imparting layer of the cured resin was obtained.

This procedure was repeated. Each time the transfer mold was reused is recorded as one cycle. The transfer mold was considered suitable for use when after use the transfer mold swelled less than 5%. For each polymerizable resin reported in Table 2 the test was stopped when the transfer mold exceeded a 5% dimension change. The amount of dimension change (length, width, and thickness) of the smooth mold was determined by measurement with a laser microscope (<1 micron error). In the case of the microstructured mold, the dimension change of 6 different protruding microstructures, approximately evenly distributed on the microstructured mold surface, were measured. For each of the 6 different protruding microstructures, the width of the microstructure at the top surface and bottom was measured along with the height of the protrusion and the depth of the protrusion. After each reuse, the same 6 locations are remeasured. If any one of the 6 locations had a dimensional change exceeding 5%, the mold was considered not suitable for reuse.

Haze

A 50 mm×50 mm size sample of the flexible mold was measured in a haze meter (NDH-SENSOR) manufactured by Nippon Densyoku Industries Co., Ltd. in accordance with ISO-14782.

Molecular Weight (Mw) Via GPC

The sample (e.g. oligomer) was dissolved in THF (tetrahydrofuran) at a concentration of 0.5 wt-% solution. The solution was filtered with a PTFE (polytetrafluoroethylene) filter having 0.5 micron pore size. A 50 microliter sample of the solution was injected into a HP-1090 SERIES instrument (calibrated with polystyrene) having a pair of 300 mm length by 7.5 mm diameter PLgel™ MIXED-D columns. The instrument utilized a refractive index detector. The samples were run at ambient temperature and a flow rate of 1.0 mL/min.

Viscosity

The viscosity was measured with a rotation viscometer manufactured by Tokyo Keiki Co., under the trade designation "BM-type" at 22° C.

Tg and Modulus

The Tg and modulus were measured with RSA-II manufactured by Rheometrics Scientific Inc. with the tension mode of 1.0 Hz frequency at the temperature range from −80 to +60 degree C. The storage modulus E'(Pa) and the loss factor (tan delta) were measured. The Tg was defined as the peak temperature of tan delta.

Various UV curable compositions were employed to prepare flexible molds. The composition and test results are reported in Table 2 as follows:

TABLE 2

| Sample | Oligomer | Mw | wt % | Diluent Monomer | Mw | SP | wt % | Initiator (1 wt %) | Visc. (Pa-s) | Tg (° C.) | E' at 22° C. (MPa) | Reuse (cycle times) |
|---|---|---|---|---|---|---|---|---|---|---|---|---|
| Ex. 1 | EB 270 | 5,700 | 80 | POA | 192 | 20.7 | 20 | D-1173 | 10.8 | 15 | 16.9 | 15 |
| Ex. 2 | EB 230 | 18,000 | 65 | AM-90G | 482 | 19.0 | 25 | D-1173 | 3.4 | −46 | 4.2 | 30 |
|  |  |  |  | A-PTMG-65 | 790 | 18.8 | 10 |  |  |  |  |  |
| Ex. 3 | UX-8101 | 5,000 | 60 | FA1DDM | 230 | 22.3 | 20 | D-1173 | 8.0 | 38 | 534.0 | 13 |
|  |  |  |  | POA | 192 | 20.7 | 10 |  |  |  |  |  |
|  |  |  |  | APG-700 | 838 | 18.2 | 10 |  |  |  |  |  |
| Ex. 5A | EB 8402 | 1,800 | 80 | FA2D | 344 | 21.8 | 20 | D-1173 | 5.0 | 17 | 34.7 | 25 |
| Ex. 5B | EB 8402 | 1,800 | 80 | FA2D | 344 | 21.8 | 20 | Irg. 2959 |  |  |  | 50 |
| Ex. 5C | EB 8402 | 1,800 | 80 | FA2D | 344 | 21.8 | 20 | Irg. 651 |  |  |  | 25 |
| Ex. 5D | EB 8402 | 1,800 | 80 | FA2D | 344 | 21.8 | 20 | Irg. 907 |  |  |  | 20 |
| Ex. 6 | UA-1083F | 7,600 | 60 | FA2D | 344 | 21.8 | 20 | Irg. 2959 | 8.3 | −17 | 8.8 | 55 |
|  |  |  |  | HX-220 | 540 | 20.1 | 20 |  |  |  |  |  |
| Ex. 7 | UA-1083F | 7,600 | 60 | FA2D | 344 | 21.8 | 20 | Irg. 2959 | 13.0 | −5 | 11.5 | 60 |
|  |  |  |  | R-551 | 512 | 21.2 | 20 |  |  |  |  |  |
| Ex. 8 | UV3000B | 26,000 | 60 | 4-HBA | 144 | 22.3 | 20 | D-1173 | 14.6 | 27 | 77.6 | 27 |
|  |  |  |  | M-5700 | 222 | 23.3 | 10 |  |  |  |  |  |
|  |  |  |  | TMPTA | 296 | 20.2 | 10 |  |  |  |  |  |
| Comp A | EB 230 | 18,000 | 45 | M-120 | 272 | 18.0 | 41 | D-1173 | 0.3 | −33 | 2.8 | 7 |
|  |  |  |  | POA | 192 | 20.7 | 5 |  |  |  |  |  |
|  |  |  |  | BEPGA | 268 | 18.8 | 9 |  |  |  |  |  |
| Comp B | UX-8101 | 5,000 | 60 | M-117 | 272 | 18.0 | 20 | D-1173 | 17.3 | 50 | 1146.6 | 3 |
|  |  |  |  | POA | 192 | 20.7 | 10 |  |  |  |  |  |
|  |  |  |  | MANDA | 312 | 19.6 | 10 |  |  |  |  |  |
| Comp C | EB 8402 | 1,800 | 80 | V#190 (ECA) | 188 | 18.6 | 20 | D-1173 | 1.3 | 14 | 26.5 | 6 |

The cured UV compositions of each of the examples had an initial haze of no greater than 5%.

Examples 9-11

The UV curable resin compositions of Examples 1, 4, 5, and Comp A were retested using a microstructured (rather than smooth) silicon mold. The microstructured silicone rubber based mold was prepared as described in further detail in U.S. patent application Ser. No. 11/030,261, filed Jan. 6, 2005. A rectangular master mold 400 mm wide×700 mm long was prepared having the following recessed lattice pattern.

Vertical grooves; 1,845 lines, 300 micron pitch, 210 micron height, 110 micron of groove bottom width (rib top width), 200 micron of groove top width (rib bottom width)

Lateral grooves; 608 lines, 510 micron pitch, 210 micron height, 40 micron of groove bottom width (rib top width), 200 micron of groove top width (rib bottom width)

A 400 mm×700 mm×1 mm SUS plate was prepared to use as substrate for silicone mold as also described in U.S. patent application Ser. No. 11/030,261, filed Jan. 6, 2005 resulting in a silicone mold having the inverse lattice pattern of master mold.

The reuse-ability of the microstructured silicone mold was evaluated with each of the UV curable polymerizable resin compositions of Example 1, Example 4, Example 5 and Comp A in the same way as Example 13.

The same results were obtained demonstrating the correlation between testing with a smooth silicone mold in comparison to a microstructured silicone mold.

What is claimed is:

1. A flexible mold comprising a transparent microstructured shape-imparting layer provided on a transparent polymeric support comprising the reaction product of a polymerizable composition comprising at least one urethane (meth) acrylate oligomer and at least one (meth)acryl monomer having a solubility parameter of at least $21[MJ/m^3]^{1/2}$.

2. The flexible mold of claim 1 wherein the (meth)acryl monomer has a solubility parameter of less than $30.0 [MJ/m^3]^{1/2}$.

3. The flexible mold of claim 1 wherein the polymerizable composition comprises 60 wt-% to 90 wt-% of urethane (meth)acrylate oligomer having a weight average molecular weight ranging from 1000 g/mole to 3500 g/mole.

4. The flexible mold of claim 1 wherein the urethane (meth) acrylate oligomer has a weight average molecular weight less than 40,000 g/mole.

5. The flexible mold of claim 1 wherein the urethane (meth) acrylate oligomer has a weight average molecular ranging from at least 6,000 g/mole to less than 20,000 g/mole.

6. The flexible mold of claim 1 wherein the (meth)acryl monomer comprises one or more (meth)acrylate monomers.

7. The flexible mold of claim 1 wherein the polymerizable composition comprises a photoinitiator.

8. The flexible mold of claim 7 wherein the photoinitiator is selected from 2-hydroxy-2-methyl-1-phenylpropane-1-one; 1-[4-(2-hydroxyethoxy)-phenyl]-2-hydroxy-2-methyl-1-propane-1-one; 2,2-dimethoxy-1,2-diphenylethane-1-one; 2-methyl-1-[4-(methylthio)phenyl]-2-morpholino-1-propanone; and mixture thereof.

9. The flexible mold of claim 1 wherein the support is at least one plastic material selected from the group consisting of polyethylene terephthalate, polyethylene naphthalate, stretched polypropylene, polycarbonate and triacetate.

10. The flexible mold of claim 1 wherein the polymerizable composition has Brookfield viscosity ranging from 1000 cps to 25,000 cps.

11. The flexible mold of claim 1 wherein the glass transition temperature of the reaction product ranges from −60° C. to 50° C.

12. The flexible mold of claim 1 wherein the glass transition temperature of the reaction product is less than 30° C.

13. The flexible mold of claim 1 wherein the glass transition temperature of the reaction product is less than 10° C.

14. The flexible mold of claim 1 wherein E' at 22° C. is less than 200 MPa.

15. The flexible mold of claim 1 wherein the polymerizable resin further comprises a (meth)acryl monomer having a solubility parameter of at least $20[MJ/m^3]^{1/2}$.

* * * * *